(12) United States Patent
Lazar

(10) Patent No.: US 6,940,341 B2
(45) Date of Patent: Sep. 6, 2005

(54) CURRENT CONTROL METHOD AND APPARATUS FOR ACTIVE POWER FILTERS

(75) Inventor: James Lazar, Moorpark, CA (US)

(73) Assignee: Taiyo Yuden Co., Ltd. (JP)

( * ) Notice: Subject to any disclaimer, the term of this patent is extended or adjusted under 35 U.S.C. 154(b) by 0 days.

(21) Appl. No.: 10/628,218

(22) Filed: Jul. 28, 2003

(65) Prior Publication Data

US 2005/0024131 A1 Feb. 3, 2005

(51) Int. Cl.[7] .................................................. H03B 1/00
(52) U.S. Cl. ...................................... 327/552; 327/553
(58) Field of Search .................................. 327/551–559

(56) References Cited

U.S. PATENT DOCUMENTS 5,656,924 A * 8/1997 Mohan et al. ............... 323/210
6,657,322 B2 * 12/2003 Skibinski et al. ........... 307/105

OTHER PUBLICATIONS

Smedley, Keyue M., *Unified Constant–Frequency Integration Control of Active Power Filters—Steady–State and Dynamics*, IEEE Transactions on Power Electronics, vol. 16, No. 3, May 2001, pp. 428–436.

Pöttker, Fabiana et al., *Single–Phase Active Power Filters for Distributed Power Factor Correction*, 2000 IEEE, pp. 500–505.

Singh, Bhim et al., *A Review of Active Filters for Power Quality Improvement*, IEE Transactions on Industrial Electronics, vol. 46, No. 5, Oct. 1999, pp. 960–971.

Quiao, Chongming et al., *A Comprehensive Analysis and Design of a Single Phase Active Power Filter with Unified Constant–frequency Integration Control*, pp. 1–7.

E. Dallago et al., Single–phase active power filter with only line current sensing, Electronic Letters Jan. 20, 2000, vol. 36, No. 2, pp. 105–106.

* cited by examiner

Primary Examiner—Timothy P. Callahan
Assistant Examiner—Cassandra Cox
(74) Attorney, Agent, or Firm—Daniel L. Dawes; Myers Dawes Andas & Sherman LLP

(57) ABSTRACT

An active filtering method and apparatus for controlling a current generator that sources/sinks an APF current for compensating polluting harmonics on a power line connecting a power source and a load. A feedback loop regulates the APF current by sensing the current output of the current generator and the current flowing through the load. The feedback loop controls the current generator to force the APF current to track a current command signal to effectively limit the APF current to a safe value within the limitations of a particular design.

25 Claims, 3 Drawing Sheets

CURRENT CONTROL METHOD AND APPARATUS FOR ACTIVE POWER FILTERS

BACKGROUND OF THE INVENTION

1. Field of the Invention

The present invention relates to power filters in general, and to active power filters in particular.

2. Description of the Prior Art

The wide use of nonlinear loads has increased the harmonic content of the voltage and current waveforms in alternating current (AC) power distribution systems. In many cases large numbers of such loads are operating, causing a corresponding increase in power line harmonics. Such harmonic currents in conjunction with their associated source impedances produce distortion of the line voltages which can cause equipment to malfunction.

To address the above problems, active power filters (APF) have been used for compensation of polluting harmonics on electricity distribution networks. An APF is a device that is connected to a power line and cancels the reactive and harmonic currents from a group of nonlinear loads so that the resulting total current drawn from an AC source is sinusoidal. Ideally, the APF needs to generate just enough reactive and harmonic current to compensate the nonlinear loads on the line, thus it handles only a fraction of the total power to the loads.

In one conventional APF design, an open loop scheme is used to control the APF current, as generally described by E. Dallago and M. Passoni in an article titled "Single-Phase Active Power Filter with Only Line Current Sensing", IEEE Electronics Letters, 20 Jan. 2000, Vol. 36, No. 2, pp. 105–106, and by K. M. Smedley, L. Zhou, and C. Qiao in an article titled "Unified Constant Frequency Control of Active Power Filters-Steady State and Dynamics", IEEE Transactions on Power Electronics, Vol. 16, No. 3, May 2001, pp. 428–436. In these systems the APF is controlled such that the output voltage of the APF is proportional to the input source current. This causes the impedance seen by the power source to appear resistive, hence maintaining the input current approximately proportional to the input voltage.

In another conventional APF design, a closed input current loop with a reference multiplier is used, as described by F. P. de Souza and I. Barbi in an article titled "Single-Phase Active Power Filters for Distributed Power Factor Correction", IEEE PESC 2000, pp. 500–505. A current loop is used to force the input source current to track the input source voltage, thereby achieving near-unity power factor.

However, in the above approaches, only the input source current is measured. This makes it difficult to control the current flow from the APF and the load. Hence, if there is an overload condition at the load, the APF control will attempt to deliver the current demanded, even if the demand is beyond the design limits of the APF.

There is, therefore, a need for an APF control method and apparatus that limit the APF current, and allow transition from a normal condition to an overload condition and back again in stable manner, while maintaining the lowest input current distortion within the design limits of the APF.

BRIEF SUMMARY OF THE INVENTION

The present invention addresses the above needs. In one embodiment the present invention provides an active filtering method and apparatus for controlling a current generator that generates an APF current for compensating polluting harmonics on a power line that connects a powersource and a load. A feedback loop regulates the APF current by sensing the current output of the current generator and the current flowing through the load. The feedback loop controls the current generator to force the APF current to track a current command signal to provide near unity power factor (i.e., proportional current), while effectively limiting the APF current to a safe value within the limitations of a particular design.

In one implementation, an active filter is provided that can be connected to a power line between a power source and a load. The active filter comprises a current generator that in response to a control signal generates an APF current to compensate for polluting harmonics on the power line. The active filter further includes a controller that controls the current generator to compensate for the polluting harmonics on the power line, such that the APF current does not exceed a selected threshold value.

Preferably, the controller further includes a limiter that generates said control signal based on feedback values of the APF current and the load current, to control the current generator such that the APF current does not exceed the selected threshold value. In one example, the active filter can include a first sensor that senses the APF current and provides a corresponding signal to the limiter that represents the feedback value for the APF current, and a second sensor that senses the load current and provides a corresponding signal to the limiter that represents the feedback value for the load current.

As such, the limiter is configured to control the current generator such that even if the APF current necessary to compensate for the polluting harmonics on the power line exceeds said selected threshold value, the APF current generated by the current generator is limited to at most the selected threshold value. The present invention provides overload protection of the APF, low input current distortion, and stable operation of the APF into and out of overload conditions while maintaining minimum input current distortion within the bounds of the APF design limits.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
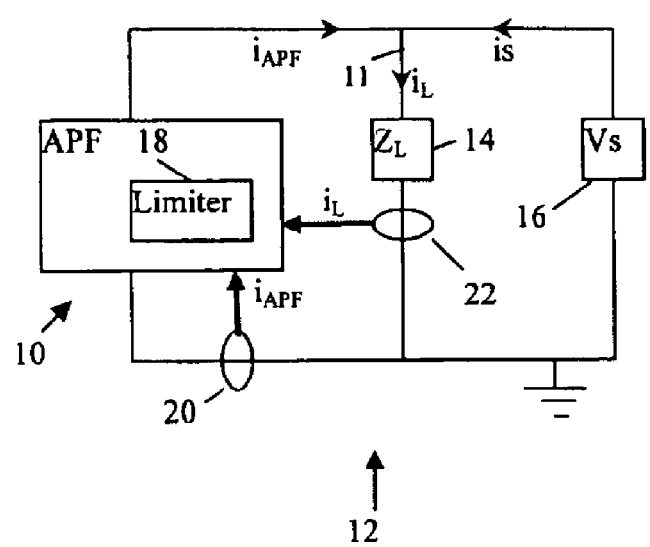
FIG. 1 is an example block diagram of an embodiment of an active power filter (APF) according to the present invention, interconnected in a parallel circuit with a load and a power source.

Referring to FIG. 1, an example block diagram of an embodiment of an APF apparatus 10 according to the present invention is shown, interconnected in parallel in a circuit 12 that includes a load 14 having am impedance $Z_L$ and a voltage source 16 providing a voltage $v_S$. The APF 10 generates (i.e., sources or sinks) the current $i_{APF}$ as necessary to compensate for the polluting harmonics on the power line 11 in the circuit 12.

The APF 10 includes a limiter 18 to control and limit the APF current $i_{APF}$, to a desirable/safe threshold value. To do so, the APF current $i_{APF}$ and the load current $i_L$ are measured using two sensors 20, 22, respectively, and the sensed values are used by the limiter 18 to control the APF current $i_{APF}$ directly.

The APF 10 operates in the circuit 12 such that:

$$i_{APF} = i_L - i_S \quad (1)$$

The desired (ideal) input source current $i_S$ is proportional to the input voltage $v_S$ in order to achieve unity input power factor, such that:

$$i_S = v_S / R_{EM} \quad (2)$$

wherein $R_{EM}$ is the emulation resistance, or the equivalent resistance seen by the input voltage source $v_S$.

To achieve the above desired performance, the APF current $i_{APF}$ is controlled so that:

$$i_{APF} = i_L - v_S / R_{EM} \quad (3)$$

If, however, the required APF current (to essentially cancel out said harmonics) exceeds a design limit $I_{max}$, then the APF current $i_{APF}$ is limited by the limiter 18 to the selected threshold value $I_{max}$ according to the following relation:

$$i_{APF} = \begin{cases} i_L - v_S / R_{EM}; & |i_L - v_S / R_{EM}| < I_{max} \\ I_{max}; & |i_L - v_S / R_{EM}| \geq I_{max} \end{cases} \quad (4)$$

Figure 2:
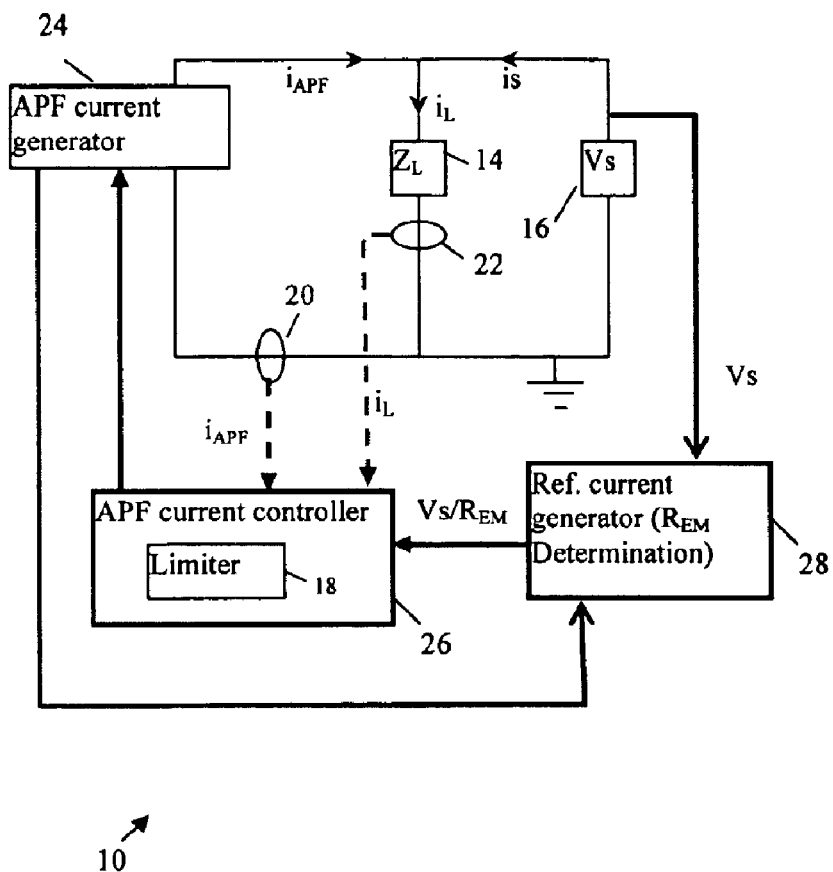
FIG. 2 is an example detailed functional block diagram of an embodiment of the active power filter of FIG. 1, interconnected in a parallel circuit with a load and a power source.

To accomplish this control strategy, a first (inner) control loop is closed around the APF current $i_{APF}$. FIG. 2 shows an example functional block diagram of an embodiment of the APF 10 according to the present invention, which includes the inner control loop, wherein the APF 10 is shown interconnected in parallel in the circuit 12 including the load 14 and the voltage source 16.

In this example, the APF 10 includes an APF current generator 24, an APF current controller 26 and a reference current generator 28. The inner control loop is formed via the APF current controller 26 and the APF current generator 24, wherein the APF current generator 24 sources or sinks the current $i_{APF}$ as controlled by the APF current controller 26.

The limiter 18 in the APF current controller 26 provides APF current control based on the measured/feedback values of the currents $i_{APF}$ and $i_L$. As such, the APF current controller 26 never commands more current than the APF current generator 18 is capable of delivering safely.

The APF current generator 24 includes an energy storage device (e.g., capacitor, inductor, etc.) that sinks or sources current as needed to compensate for said polluting harmonics. A second (outer) control loop in the APF 10 maintains the energy level (e.g., capacitor voltage, inductor current, etc.) of the energy storage device at a safe value. The outer control loop is formed via the reference current generator 28 with the APF current generator 24 feeding back the energy level of the energy storage device into the reference current generator 28.

In the example described below, wherein the energy storage device comprises a capacitor, the reference current generator 28 determines the value of $R_{EM}$ based on the energy storage device voltage, and generates the value $v_S/R_{EM}$ for the APF current controller 26. As such, the outer control loop determines the value of $R_{EM}$ that provides an energy balance such that the energy storage source voltage does not grow too large (i.e., the outer control loop provides the proper value of $R_{EM}$ for scaling $V_S$ in relation 4 above).

Figure 3:
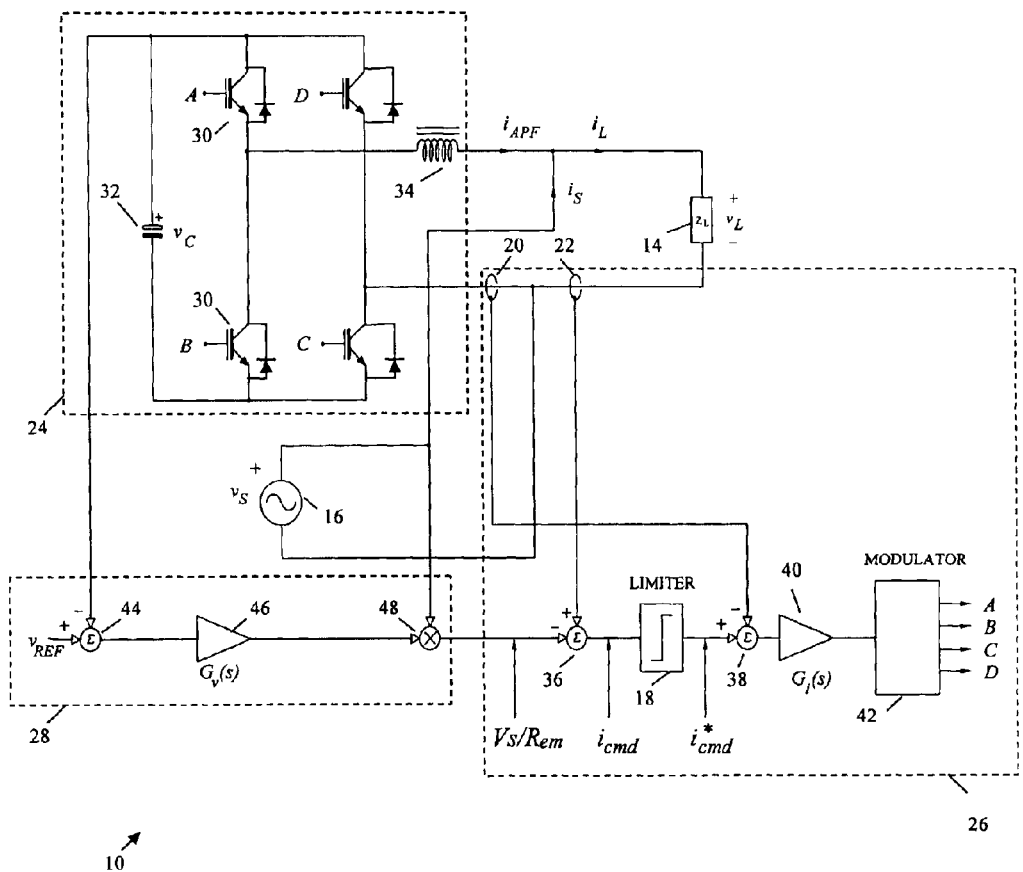
FIG. 3 is an example functional block diagram of an example implementation of the active power filter of FIG. 2, interconnected in a parallel circuit with a load and a power source.

FIG. 3 is a functional block diagram illustrating an example implementation of the APF 10 of FIG. 2, according to an embodiment of the present invention. The APF current generator 24, the APF current controller 26 and the reference current generator 28 are shown connected in a parallel circuit with the load 14 and the voltage source 16.

In this embodiment, the APF current generator 24 includes an H-bridge that can source or sink current through an inductor. In this example, the H-bridge comprises four controllable switches 30 (e.g., IGBT, MOSFET, etc.) connected in an H pattern. The switches 30 can be controlled by the APF current controller 26 to allow sourcing or sinking current from/to said energy storage device, such as a capacitor 32, through an inductor 34.

The APF current controller 26 includes a first summer 36, the limiter 18, a second summer 38, a gain amplifier 40 and a modulator 42. A current command signal $i_{cmd}$ is generated at the output of the summer 36 using the input values $i_L$ from the current sensor 22 and $V_S/R_{EM}$ from the reference current generator 28, wherein:

$$i_{cmd} = i_L - v_S / R_{EM} \quad (5)$$

The current command signal $i_{cmd}$ is then bounded by the limiter 18. The limiter output is a bounded current command signal $i_{cmd}^*$, which serves as the reference current for the inner current loop. In this example, the bounded current command signal $i_{cmd}^*$ is generated according to the following relation:

$$i_{cmd}^* = \begin{cases} i_L - v_S / R_{EM}; & |i_L - v_S / R_{EM}| < I_{max} \\ I_{max}; & |i_L - v_S / R_{EM}| \geq I_{max} \end{cases} \quad (6)$$

The bounded command current $i_{cmd}^*$ and the sensed current $i_{APF}$ are combined in the summer 38 and passed through the gain amplifier 40, to provide input control to the modulator 42. The modulator 42 provides four outputs (A, B, C, D) for the four switches 30 in the APF current generator 24, respectively, wherein each MOSFET switch 30 is given a duty cycle by the action of the modulator 42 for the capacitor 32 to sink or source current while satisfying relations (4)–(6) above.

As such, the wide bandwidth inner control loop is used to control the current generator 24 to force the APF current $i_{APF}$ to track the bounded command current $i_{cmd}^*$, thereby achieving the desired performance according to relation (6)

above. The APF current $i_{APF}$ is sensed directly, while the command current, $i_L - v_S/R_{EM}$, is bounded by the limiter 18.

Accordingly, a current control method according to the present invention combines two major feedback/control loops. The first feedback loop (said inner control loop) regulates the APF current $i_{APF}$ using the two current sensors 20, 22. The first feedback loop forces the APF current to track the bounded current command signal to provide near unity power factor (i.e., proportional current), while effectively limiting the APF current to a safe value within the limitations of a particular design.

The second feedback loop (said outer control loop) is provided to regulate the high voltage buss. The second feedback loop has a low crossover frequency below that of the input AC line, and includes the reference current generator 28. In this example, the reference current generator 28 comprises a summer 44, a gain amplifier 46 and an analog multiplier 48.

The summer 44 determines the difference between the capacitor voltage $v_C$ in the APF current generator 24 and a reference voltage $v_{REF}$. The output of the gain amplifier 46 represents an error signal (i.e., indicating the value $1/R_{EM}$) which is fed to the analog multiplier 48. The analog multiplier 48 uses the error signal to scale the input voltage signal $V_S$ and generates the reference signal $V_S/R_{EM}$.

As noted, the difference between the load current signal $i_L$ and the reference signal $V_S/R_{EM}$ is the current command signal $i_{cmd}$, wherein the APF performance is ideal to the extent that the APF current $i_{APF}$ tracks the current command signal $i_{cmd}$.

As such, the present invention provides inherent overload protection for the APF 10, low input current distortion, and stable operation of the APF 10 into and out of overload conditions while maintaining minimum input current distortion within the bounds of the APF design limits. Although in the above examples the load current $i_L$ was sensed to provide necessary shaping of the input current waveform, either the input source current $i_S$ or preferably the load current $i_L$ can be used.

Further, though in the description and claims herein the APF current generator is described to generate a current $i_{APF}$, those skilled in the art recognize that generating the current $i_{APF}$ in this context means sourcing or sinking a current as necessary to compensate for the polluting harmonics on the power line in accordance with relations (4)–(6) above.

In another aspect of the present invention, the current generator is controlled to compensate for the polluting harmonics on the power line, such that the current $i_{APF}$ is bounded by a selected upper threshold and a selected lower threshold.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed is:

1. An active filter that can be connected to a power line between a power source and a load, the active filter comprising:
   a current generator that can be connected to the power line, wherein in response to a control signal the current generator generates a current $i_{APF}$ to compensate for polluting harmonics on the power line; and
   a controller that generates a control signal that controls the current generator to compensate for the polluting harmonics on the power line, wherein the controller is configured to generated said control signal such that the current $i_{APF}$ from the current generated does not exceed a selected threshold value.

2. The active filter of claim 1, wherein the controller further includes a limiter that generates said control signal based on feedback values of the current $i_{APF}$ and the current $i_L$ flowing through the load, to control the current generator such that the current $i_{APF}$ does not exceed the selected threshold value.

3. The active filter of claim 2, further comprising:
   a first sensor that senses the current $i_{APF}$ and provides a corresponding signal to the limiter that represents the feedback value for the current $i_{APF}$;
   a second sensor that senses the current $i_L$ flowing through the load and provides a corresponding signal to the limiter that represents the feedback value for the current $i_L$.

4. The active filter of claim 2, wherein the limiter is configured to control the current generator such that even if the current $i_{APF}$ necessary to compensate for the polluting harmonics on the power line exceeds said selected threshold value, the current $i_{APF}$ generated by the current generator is limited to at most the selected threshold value.

5. The active filter of claim 2, wherein:

the power source comprises an input voltage source providing a voltage $v_S$; and the limiter generates the control signal such that the current $i_{APF}$ is controlled as:

$$i_{APF} = \begin{cases} i_L - v_S/R_{EM}; & |i_L - v_S/R_{EM}| < I_{\max} \\ I_{\max}; & |i_L - v_S/R_{EM}| \geq I_{\max}, \end{cases}$$

where $R_{EM}$ represents the equivalent resistance seen by the input voltage source $v_S$, and $I_{max}$ represents said selected threshold value.

6. The active filter of claim 5, further comprising a reference current generator that provides a reference current value to the controller, wherein the reference current value represents the ratio value $V_S/R_{EM}$.

7. The active filter of claim 6, wherein:

the current generator includes an energy storage device that sources or sinks the current $i_{APF}$ as necessary to compensate for polluting harmonics on the power line, wherein the current $i_{APF}$ does not exceed the selected threshold value; and the reference current generator receives a voltage feedback value from the current generator that represents the energy storage device voltage, and the reference current generator determines the value $R_{EM}$ based on the voltage feedback value from the current generator, to achieve energy balance whereby the energy storage device voltage does not exceed a selected limit.

8. The active filter of claim 1, wherein the current generator comprises:

an energy storage device; and a switch controlled by the control signal from the controller, such that the energy storage device sources or sinks the current $i_{APF}$ as necessary to compensate for polluting harmonics on the power line, wherein the current $i_{APF}$ does not exceed a selected threshold value.

9. The active filter of claim 8, wherein:

the energy storage device includes a capacitor device; and the current generator further includes an inductor, such that the capacitor devices sources or sinks the current $i_{APF}$, through the inductor.

10. An active filter connected to a power line between a power source and a load to compensate for polluting harmonics on the power line, the active filter comprising:

a current generator connected to the power line in a parallel circuit with the power source and the load, wherein in response to a control signal the current generator generates a current $i_{APF}$ to compensate for polluting harmonics on the power line; and a current controller that controls the current generator to compensate for the polluting harmonics on the power line, the controller including:

a first sensor that senses the current $i_{APF}$ and provides a corresponding signal that represents a feedback value for the current $i_{APF}$;

a second sensor that senses the current $i_L$ flowing through the load and provides a corresponding signal that represents the feedback value for the current $i_L$; and a limiter that generates said control signal based on feedback values of the current $i_{APF}$ and the current $i_L$, wherein the limiter is configured to control the current generator such that if the current $i_{APF}$ necessary to compensate for the polluting harmonics on the power line exceeds a selected threshold value, the current $i_{APF}$ generated by the current generator is limited to at most the selected threshold value.

11. The active filter of claim 10, wherein:

the power source comprises an input voltage source providing a voltage $v_S$; and the limiter generates the control signal such that the current $i_{APF}$ is controlled as:

$$i_{APF} = \begin{cases} i_L - v_S/R_{EM}; & |i_L - v_S/R_{EM}| < I_{\max} \\ I_{\max}; & |i_L - v_S/R_{EM}| \geq I_{\max}, \end{cases}$$

where $R_{EM}$ represents the equivalent resistance seen by the input voltage source $v_S$, and $I_{max}$ represents said selected threshold value.

12. The active filter of claim 11, further comprising a reference current generator that provides a reference current value to the controller, wherein the reference current value represents the ratio value $V_S/R_{EM}$.

13. The active filter of claim 12, wherein:

the current generator includes an energy storage device that sources or sinks the current $i_{APF}$ as necessary to compensate for polluting harmonics on the power line, wherein the current $i_{APF}$ does not exceed the selected threshold value; and the reference current generator receives a feedback value from the current generator that represents the level of the energy stored in the energy storage device, and the reference current generator determines the value $R_{EM}$ based on the feedback value from the current generator, to achieve energy balance whereby the energy level of the energy storage device is maintained within predetermined limits.

14. The active filter of claim 13, wherein the current generator further comprises a switch controlled by the control signal from the controller, such that the energy storage device sources or sinks the current $i_{APF}$ as necessary to compensate for polluting harmonics on the power line, wherein the current $i_{APF}$ does not exceed a selected threshold value.

15. The active filter of claim 14, wherein:

the energy storage device includes a capacitor device; and the current generator further includes an inductor, such that the capacitor devices sources or sinks the current $i_{APF}$, through the inductor.

16. A method of filtering a power line having a power source and a load connected thereto, comprising the steps of:

providing a current generator that can be connected to the power line, wherein the current generator generates a current $i_{APF}$ to compensate for polluting harmonics on the power line; and controlling the current generator to compensate for the polluting harmonics on the power line, such that the current $i_{APF}$ from the current generator does not exceed a selected threshold value.

17. The method of claim 16, wherein the steps of controlling the current generator further includes the steps of controlling the current generator based on feedback values of the current $i_{APF}$ and the current $i_L$ flowing through the load, such that the current $i_{APF}$ does not exceed the selected threshold value.

18. The method of claim 17, wherein the steps of controlling the current generator further includes the step of:

sensing the APF current $i_{APF}$ with a first sensor that provides a corresponding signal representing the feedback value for the current $i_{APF}$; and sensing the load current $i_L$ with a second sensor that provides a corresponding signal representing the feedback value for the current $i_L$.

19. The method of claim 17, wherein the steps of controlling the current generator further includes the step of:

controlling the current generator such that even if the current $i_{APF}$ necessary to compensate for the polluting harmonics on the power line exceeds said selected threshold value, the current $i_{APF}$ generated by the current generator is limited to at most the selected threshold value.

20. The method of claim 17, wherein:

the power source comprises an input voltage source providing a voltage $v_S$; and the current $i_{APF}$ is controlled such that:

$$i_{APF} = \begin{cases} i_L - v_S / R_{EM}; & |i_L - v_S / R_{EM}| < I_{max} \\ I_{max}; & |i_L - v_S / R_{EM}| \geq I_{max}, \end{cases}$$

where $R_{EM}$ represents the equivalent resistance seen by the input voltage source $v_S$, and $I_{max}$ represents said selected threshold value.

21. The method of claim 20, further comprising the steps of determining a reference current value that represents the ratio value $V_S/R_{EM}$.

22. The method of claim 21, wherein:

the current generator includes an energy storage device that sources or sinks the current $i_{APF}$ as necessary to compensate for polluting harmonics on the power line, wherein the current $i_{APF}$ does not exceed the selected threshold value; and the steps of determining a reference current value, further includes the steps of receiving a voltage feedback value from the current generator that represents the energy storage device voltage, and determining the value $R_{EM}$ based on the voltage feedback value from the current generator, to achieve energy balance whereby the energy storage device voltage does not exceed a selected limit.

23. The method of claim 16, wherein the current generator comprises:

an energy storage device; and a controllable switch, such that the energy storage device sources or sinks the current $i_{APF}$ as necessary to compensate for polluting harmonics on the power line, wherein the current $i_{APF}$ does not exceed a selected threshold value.

24. The method of claim 23, wherein:

the energy storage device includes a capacitor device; and the current generator further includes an inductor, such that the capacitor devices sources or sinks the current $i_{APF}$, through the inductor.

25. The method of claim 16, wherein the step of controlling the current generator further includes controlling the current generator to compensate for the polluting harmonics on the power line, such that the current $i_{APF}$ is bounded by a selected upper threshold and a selected lower threshold.

* * * * *